Aug. 2, 1960     J. J. KLEIN     2,947,525
DIFFUSER TUBE
Filed Sept. 15, 1951     2 Sheets-Sheet 1
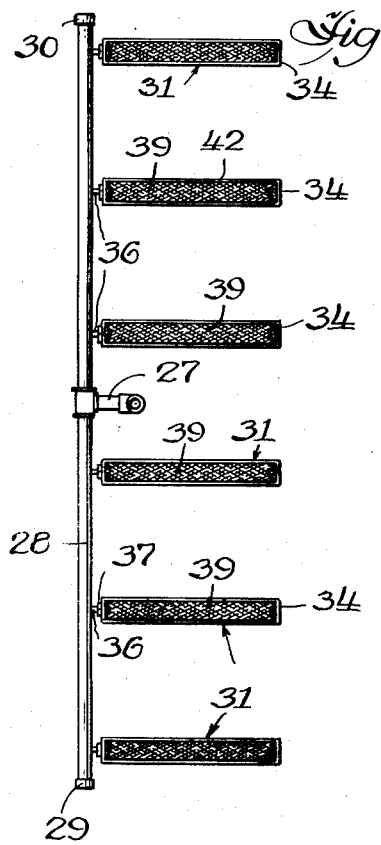
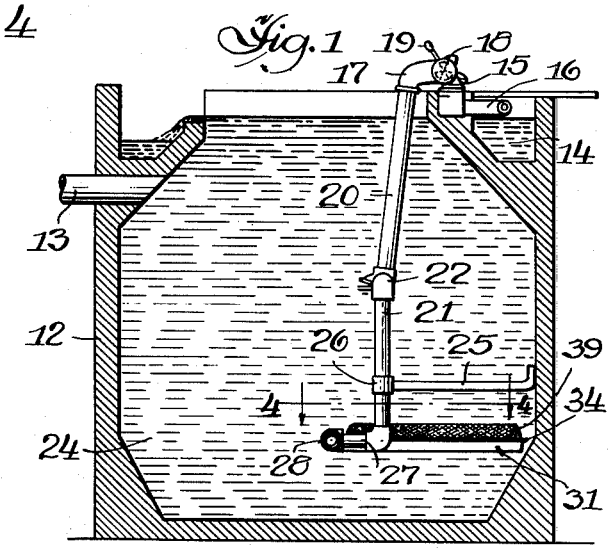
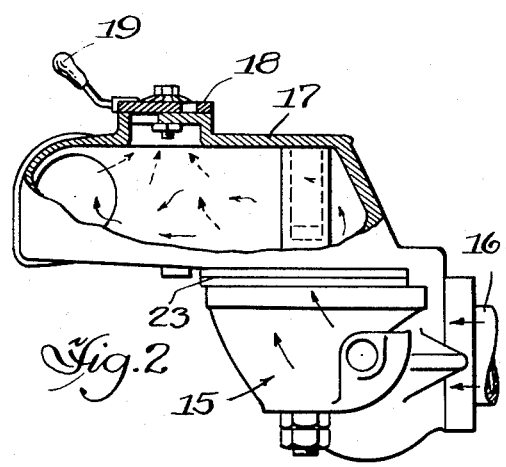
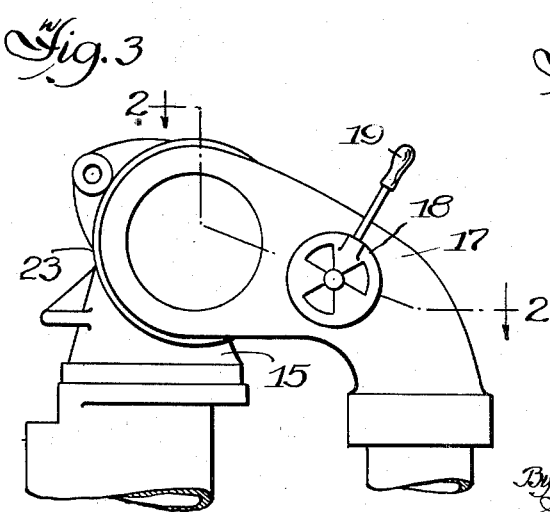
Inventor,
Joseph J. Klein,
By: Schneider & Dressler,
Attys.

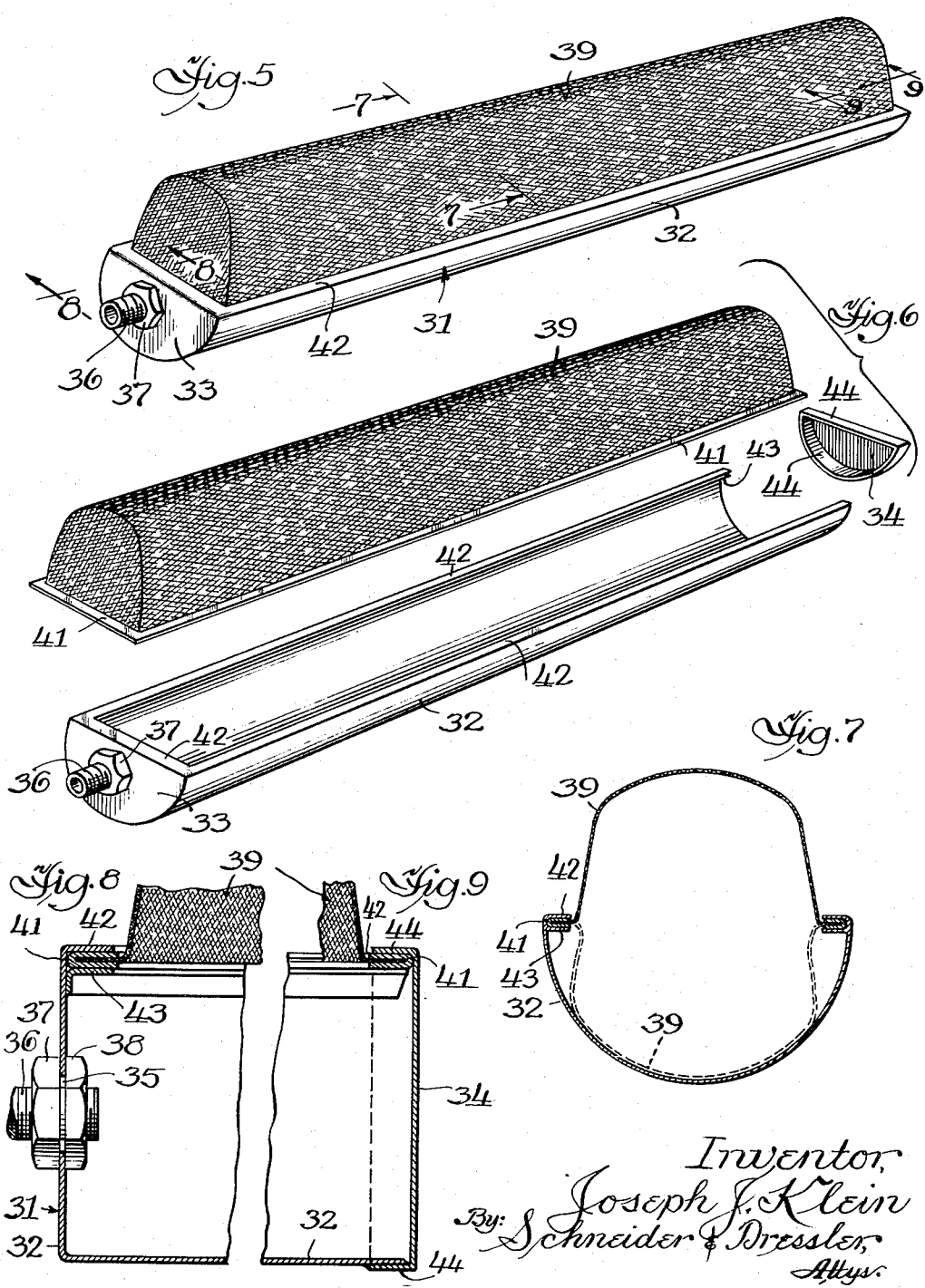

United States Patent Office 2,947,525
Patented Aug. 2, 1960

2,947,525

DIFFUSER TUBE

Joseph J. Klein, Glencoe, Ill., assignor, by mesne assignments, to Food Machinery and Chemical Corporation, San Jose, Calif., a corporation of Delaware Filed Sept. 15, 1951, Ser. No. 246,854

4 Claims. (Cl. 261—122)

This invention relates to a diffuser tube used for the aeration of liquids or for the dispersion of gases or vapors therein, and more particularly to diffuser tubes having a solid bottom portion and an upper portion made of collapsible, foraminated fabric into which the air or gas is supplied under pressure and through the interstices of which the air or gas passes in fine bubbles into the liquid in which the diffuser tube is immersed.

Diffusers of the type with which the present invention is concerned are employed in the activated sludge process of treating sewage, ore flotation processes, treatment of industrial wastes, various fermentation processes, and other chemical processes where gas-liquid contact is essential. In the past such diffusers have in the main been made of porous carbon and ceramic material or by wrapping a cord about a hollow foraminated core so that air was permitted to pass through openings provided between adjacent convolutions of the cord. These diffusers were costly. In addition they became clogged more or less readily and had to be taken off the air main to be cleaned. Frequently they could not be cleaned and had to be replaced. This made maintenance costly.

Another type of known diffuser comprises a hose having attached thereto a fabric bag porous enough to permit air to flow therethrough into the surrounding liquid. One such diffuser is disclosed in the Kraut Patent No. 1,849,146, issued March 15, 1932. This type of diffuser has several serious disadvantages. It has been found impossible to control the flow of air through the bag to provide uniform aeration of the liquid in which the bag is held because the bag is free to swing around in the liquid and cause the air bubbles escaping from the bag to coalesce into larger bubbles of varying size. Another disadvantage of this type of diffuser is the fact that the bag can not be deflated and inflated quickly enough to dislodge the solid matter deposited by the liquid in the pores of the bag. The deflation of this bag is so slow that the liquid in which the bag is immersed percolates through the fabric, bringing in solid matter which clogs the pores, and makes frequent cleaning necessary. An additional disadvantage of this type of diffuser is that the size of the bag that can be used is limited, and the volume of liquid that can be aerated by each bag is likewise limited.

The diffuser tube of the present invention comprises a rigid, nonporous lower body portion and a flexible, porous upper body portion coextensive in length with the lower portion. The length of this tube is substantially greater than the width or height thereof. Air or gas (aeriform body) is passed into the lower body portion. The aeriform body then passes into and through the porous upper portion to the surrounding medium.

The porous member may be made of flexible, porous, woven fabric, suitably of a plastic material. Thus it may be made from a synthetic linear polyamide such as nylon, from a copolymer of vinyl chloride and vinylidene chloride of the type known commercially as "Saran," from "Orlon" or other synthetic plastic material, from canvas or other suitable textile material, or from porous metal fabric or other suitable fabric strong enough to withstand the action of sewage and the pressure of the liquid in which it is immersed and yet be flexible enough to be collapsed quickly when the air or gas supply is shut off. The interstices of the fabric through which the air or gas flows may be varied as desired but preferably are small enough to cause the air or gas to pass through in fine bubbles to provide more efficient aeration or gasification.

The lower, nonporous member may be made of metal, glass or any other suitable solid, rigid material. It may also be made of a plastic such as phenol-formaldehyde, urea-formaldehyde or other thermosetting type of resin, or of woven glass or other fabric impregnated with a synthetic resin, preferably of the thermosetting type.

Hereinafter, in the description of the invention, reference will be made only to "air" but with the understanding that by this term applicant contemplates gas or other aeriform body.

The diffuser tube of the present invention may be used individually or a plurality of such tubes may be ganged together. It is preferred to connect a plurality of such tubes to an air supply pipe with the tubes arranged in parallel relationship and positioned adjacent one wall of the tank. The tubes are made relatively long so as to emit a long stream of bubbles, and by ganging the tubes in parallel relationship to a supply pipe, a wide band of bubbles is obtained. The bubbles follow a circulatory path through the liquid in the tank to provide uniform aeration throughout the liquid.

The tube of the present invention is extremely efficient in that it provides a band of uniform sized bubbles throughout its entire length. The bubbles are very small and will not coalesce. The tube of the present invention provides a more uniform band of finely divided bubbles than has heretofore been known in the prior art.

In use, it is preferred that the diffuser tubes of the present invention be connected to an air supply through a line which includes a quick acting valve. When the quick acting valve is opened, the air supply is instantaneously cut off from the tubes, thereby causing a quick and complete collapse of the upper portion of each of the tubes. When the upper portion collapses, it will strike the nonporous lower portion causing solid matter to be broken away from the surface of the porous portion of the tube. When the quick acting valve is closed, the tube is quickly inflated. The sudden inflation of the upper portion of the tube serves to break away solid matter which is not broken away when the porous portion strikes the lower portion of the tube. Solid matter which is not broken away is sufficiently loosened in the pores of the tube so that it will be blown out by the pressure of the air when the tube is inflated. The deflation is so rapid as to prevent infiltration of the surrounding liquid. The diffuser tubes are kept quite clean at all times by merely turning the valve controlling the air in order to deflate and then re-inflate the tubes, with the result that the maintenance expense of the present system is relatively low. If a more thorough cleaning is necessary, or if any repairs are required, the diffuser tubes may be readily removed.

The structure of the present invention, by means of which the above and other advantages are attained, will be described in detail in the following specification, taken in conjunction with the accompanying drawings, showing a preferred illustrative embodiment of the invention, in which:

Figure 1 is a cross sectional view through a sewage tank containing a diffuser tube of the present invention;

Fig. 2 is a sectional view along line 2—2 of Fig. 3, with parts in elevation, showing the hollow stanchion through which air is forced and details of the air release valve;

Fig. 3 is a side elevation of the stanchion shown in Fig. 2;

Fig. 4 is a top plan of the air supply pipe having a plurality of diffuser tubes of the present invention secured thereto;

Fig. 5 is a perspective view of the diffuser tube of the present invention;

Fig. 6 is an exploded view of the diffuser tube;

Fig. 7 is a cross sectional view taken along lines 7—7 of Fig. 5;

Fig. 8 is a sectional view taken along lines 8—8 of Fig. 5 with the inlet shown in elevation; and Fig. 9 is a sectional view taken along lines 9—9 of Fig. 5.

In the drawings, the reference numeral 12 indicates a sewage tank having an inlet 13 and an outlet 14. A hollow stanchion 15 connects an air main 16 to an elbow 17. Air is forced through main 16 by any suitable pump or blower (not shown) and into elbow 17. A valve 18, operated by handle 19, is positioned in elbow 17 and opens to the atmosphere so that when it is in open position the air from main 16 flows directly to the atmosphere. When valve 18 is closed the air flows through elbow 17 into a connecting pipe 20. It will be noted that valve 18 is a quick acting valve that may be opened very rapidly so as to cut off the air supply to pipe 20 practically instantaneously by diverting the flow of air from main 16 to the atmosphere. A pipe 21, having its upper end offset laterally from the lower end of pipe 20 is pivotally connected thereto, as indicated at 22. Elbow 17 is pivoted to stanchion 15, as indicated at 23, to permit pipes 20 and 21 to be swung out of the sewage tank 12, in the manner described in the Lannert Patent No. 2,328,655, granted September 7, 1943, for cleaning, or for repairs of any of the mechanism normally immersed in the sewage 24. A bumper guard 25 is secured to pipe 21, as indicated at 26, to keep the mechanism properly spaced from the wall of tank 12.

At the lower end of pipe 21 there is a coupling 27 which is connected to an air supply pipe 28. Pipe 28 is closed at each end as indicated at 29 and 30, so that air passing through the pipe will enter diffuser tubes 31. Diffuser tubes 31 are positioned on pipe 28 parallel to one another and are of a substantial length. By so positioning the tubes, a wide band of bubbles is provided over the entire length of pipe 28, the width of the band of bubbles being equal to the length of the tubes 31. It is desirable that tubes 31 be of substantial length. If the tubes are not of sufficient length, a great number of tubes would be necessary to provide a sufficiently wide aeration band for efficient aeration, and an increased number of tubes increases the cost of the installation.

The diffuser tubes may be arranged adjacent the wall of the tank opposite inlet 13, as shown, or adjacent any other wall as desired. The liquid flowing through the inlet into the tank causes a circulatory movement of the sewage in the tank. Accordingly, air bubbles which are forced through the interstices of the diffuser tubes, by pressure of the air flowing through air supply pipe 28, are carried by the circulatory motion of the sewage in a well defined path as long as the diffuser tubes remain in fixed position relative to the tank. The bubbles uniformly aerate the liquid through which they circulate.

The tube 31 comprises a solid, nonporous lower body portion or bottom 32 which is preferably substantially semi-cylindrical in cross section. Bottom 32 has an integral end cap 33 at one end and a separate end cap 34 at the other. End cap 33 is provided with a suitable opening 35 through which a threaded inlet pipe 36 passes, the inlet pipe being screwed into a threaded opening (not shown) in air supply pipe 28. Inlet pipe 36 is secured to end cap 33 by means of nuts 37 and 38.

It is preferred to provide the air inlet at one end of the tube as shown in the drawings, so that when the collapsible porous upper portion or top 39 collapses, it will strike solid bottom. However, the air inlet may also be positioned in the bottom of lower portion 32.

As shown, the length of the tube is substantially greater than the width or height of the tube. The tube is made of this length not only to provide a wide aeration band and to insure good cleaning thereof by deflation and inflation as described above, but also to prevent the flexible top from being sucked into the air inlet when the tube is collapsed should the air inlet be provided in the bottom of the tube. If the tube were short, the flexible top will be sucked into the inlet when deflated, and when pressure is again applied to the tube it may not reinflate.

Flexible top 39 is also preferably substantially semi-cylindrical in cross section so that when the top is in the collapsed position (as shown in dotted lines in Fig. 7), it assumes the contour of bottom 32. The height of the top 39 when inflated is preferably slightly greater than the depth of bottom 32. When collapsed, the top will strike bottom 32 dislodging foreign material which has accumulated in the pores, but the material of the top will not fold over upon itself. If the top is made of too great a height, the material will fold over upon itself when it strikes the bottom with the result that foreign material in the pores will not be efficiently dislodged. Top 39 when inflated may have a height substantially equal to or slightly less than the depth of bottom 32, but this is not preferred.

It is not essential that flexible top 39 and rigid bottom 32 be semi-cylindrical in cross section; however, the upper portion and lower portion should be substantially of the same shape so that when the upper portion is collapsed it may conform to the contour of the lower portion without the material folding over on itself. Foreign material in the pores is most effectively removed by having the top conform to the contour of the bottom when the top is deflated.

The edges of top 39 are pinched between a mounting rim 41 which forms a ledge about the entire lower periphery of the top. The bottom has an upper flange 42 extending about three sides thereof and a lower flange 43 parallel to and immediately below flange 42. When assembled, mounting rim 41 is positioned between flanges 42 and 43. End cap 34, which has a peripheral flange 44, is then positioned as shown in Fig. 9, and suitably secured as by soldering or brazing to lower portion 32 and mounting rim 41.

When valve 18 is closed, the air from air main 16 passes through stanchion 15, elbow 17, pipes 20 and 21, coupling 27, air supply pipe 28, and into diffuser tubes 31. The air is then forced through the interstices of the top 39 of tubes 31 in fine bubbles which aerate the sewage or other liquid in which the tubes are immersed in a very efficient manner. Although the tendency of the air passing through the walls of the diffuser tubes is to keep the pores of said walls clean by blowing away the solid matter contained in the sewage, some solid matter does accumulate on the walls. In time, such solid matter would clog the pores of the tube. This possibility of clogging the pores of the diffuser tube is obviated by merely opening and then closing valve 18 without any appreciable interruption of the aerating process.

As soon as valve 18 is opened, the air which would otherwise be forced through pipe 20 is blown out to the atmosphere. The pressure of the sewage adjacent the diffuser tubes is much greater than atmospheric pressure and accordingly, the pressure of the sewage causes the top 39 of each tube 31 to immediately collapse and the air which was in the tubes is forced through air supply pipe 28 and backwards through the system. The deflation is so rapid, because of the pressure of the sewage on the outside of the diffuser tubes, that the liquid sewage cannot percolate into the walls of the diffuser tubes.

When the tube quickly deflates, the top 39 slams against the bottom 32, dislodging particles of solid foreign matter in the pores. The slamming dislodges practically all of the foreign material because the major surface of upper portion 39 comes into contact with lower portion 32 and conforms generally to the contour of lower portion 32 over substantially the entire length of the tube. When valve 18 is again closed, upper portion 39 quickly reinflates. Any foreign matter not dislodged when the top slams against the bottom is usually dislodged by the reinflation of the upper portion.

Although I have described a preferred embodiment of my invention in considerable detail it is understood that the description is intended to be illustrative rather than restrictive as a variety of modifications may be made without departing from the spirit or scope of the invention. For example, the semi-tubular upper portion may be secured to the lower portion by riveting the edges of the upper portion between a flange similar to flange 42 and a peripheral mounting plate, rather than securing the upper and lower portions as shown in the drawings. Accordingly, I do not desire to be restricted to the exact structure herein described.

I claim:

1. A diffuser tube comprising a rigid, nonporous portion and a flexible, inflatable, porous portion, said nonporous portion being elongated and substantially semicylindrical in cross section, said nonporous portion having an inlet for an aeriform body, said porous portion being substantially coextensive in length with said nonporous portion, said porous portion being substantially semicylindrical in cross section when inflated, the height of said porous portion when inflated being slightly greater than the depth of said nonporous portion, whereby said porous portion strikes against the inner surface of said nonporous portion to dislodge solid foreign matter from the pores of said porous portion when said porous portion is deflated.

2. A diffuser tube comprising a rigid, nonporous portion and a flexible, inflatable, porous portion, said nonporous portion being elongated and having an inlet for an aeriform body, said porous portion being substantially coextensive in length with said nonporous portion, the height of said porous portion when inflated being slightly greater than the depth of said nonporous portion, whereby said porous portion strikes against the inner surface of said nonporous portion to dislodge solid foreign matter from the pores of said porous portion when said porous portion is deflated.

3. A diffuser tube comprising a nonporous, rigid portion and an inflatable and collapsible porous portion, said porous and nonporous portions being substantially coextensive in length, the longitudinal dimension of said tube being substantially greater than the transverse and vertical dimensions thereof, the height of said porous portion in inflated condition being slightly greater than the depth of said nonporous portion, said porous portion being so dimensioned that a substantial area thereof strikes against the inner surface of said nonporous portion when said porous portion is collapsed to dislodge any solid foreign matter from the pores of said porous portion, and an inlet for an aeriform body in said nonporous portion.

4. In apparatus for transmitting fluid through a porous medium, the combination comprising: a receptacle for connection through a quick-acting valve alternately to a source of fluid under pressure and to the atmosphere, said receptacle having rigid impervious wall means and an opening to the exterior, and a fluid transmitting element of flexible porous material secured to said receptacle over said opening, whereby it will be flexed in one direction to an extended position outside the receptacle when the fluid pressure in the receptacle exceeds the external fluid pressure, and, when the external fluid pressure exceeds the fluid pressure in the receptacle, will be suddenly flexed in the opposite direction and inverted into the receptacle, said receptacle and said element being so conformed with respect to size and shape that, upon such inversion said element will come into engagement with the inner surface of said wall means and be supported thereby.

References Cited in the file of this patent

UNITED STATES PATENTS

| | | |
|---|---|---|
| 1,703,967 | Sperr | Mar. 5, 1929 |
| 1,717,713 | Logan | June 18, 1929 |
| 1,755,614 | Seil | Apr. 22, 1930 |
| 1,792,285 | Curry et al. | Feb. 10, 1931 |
| 1,792,286 | Curry et al. | Feb. 10, 1931 |
| 1,849,146 | Kraut | Mar. 15, 1932 |
| 2,271,814 | Coolidge | Feb. 3, 1942 |
| 2,294,973 | Ford | Sept. 8, 1942 |
| 2,328,655 | Lannert | Sept. 7, 1943 |

FOREIGN PATENTS

| | | |
|---|---|---|
| 558,462 | Germany | Sept. 8, 1932 |